United States Patent
Yokoi et al.

(10) Patent No.: US 9,158,996 B2
(45) Date of Patent: Oct. 13, 2015

(54) LEARNING IMAGE COLLECTION APPARATUS, LEARNING APPARATUS, AND TARGET OBJECT DETECTION APPARATUS

(71) Applicant: KABUSHIKI KAISHA TOSHIBA, Minato-ku, Tokyo (JP)

(72) Inventors: Kentaro Yokoi, Tokyo (JP); Tomokazu Kawahara, Kanagawa-ken (JP); Tomoki Watanabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 19 days.

(21) Appl. No.: 14/024,851

(22) Filed: Sep. 12, 2013

(65) Prior Publication Data

US 2015/0071529 A1    Mar. 12, 2015

(51) Int. Cl.
G06K 9/00 (2006.01)
G06K 9/62 (2006.01)

(52) U.S. Cl.
CPC ............... *G06K 9/6256* (2013.01); *G06K 9/00* (2013.01)

(58) Field of Classification Search
CPC ............... G06T 7/0024; G06T 7/0085; G06T 2207/20021; G06T 7/2013; G06T 7/2033; G06T 7/0014; G06F 17/3079; G06F 19/24; G06F 3/0481; G06F 17/30; G06K 9/00201; G06K 9/00456; G06K 9/3241; G06K 9/629; G06K 9/00288; G06K 9/00268; G06K 9/6278; G06K 9/00234; G06K 9/6807; H04N 5/144; H04N 5/772; H04N 5/23212; G10L 15/063; C07K 14/70503
USPC ......... 382/103, 115, 159, 160, 168, 171–173; 348/169, 231, 700
See application file for complete search history.

(56) References Cited

U.S. PATENT DOCUMENTS 5,910,999 A * 6/1999 Mukohzaka .................. 382/124
6,263,088 B1 * 7/2001 Crabtree et al. .............. 382/103

(Continued)

FOREIGN PATENT DOCUMENTS

JP    2007-310480    11/2007

OTHER PUBLICATIONS

Enzweiler et al, Monocular Pedestrian Detection: Survey and Experiments, IEEE Trans. on Pattern Analysis and Machine Intelligence, vol. 31, No. 12, Dec. 2009.

(Continued)

*Primary Examiner* — Vu Le
*Assistant Examiner* — Aklilu Woldemariam
(74) *Attorney, Agent, or Firm* — Amin, Turocy & Watson, LLP

(57) ABSTRACT

A disclosure describes a learning image collection apparatus includes an acquisition unit, an extraction unit, a calculation unit, and a selection unit. The acquisition unit acquires an image including a target object. The extraction unit extracts, from the image, a plurality of candidate areas being candidates for the target object. The calculation unit calculates one of a first degree of similarity, a second degree of similarity, and a third degree of similarity, the first degree of similarity being a degree of similarity between one of the candidate areas and a predetermined area, the second degree of similarity being a degree of similarity between a size of the target object and a predetermined size, the third degree of similarity being a degree of similarity between the plurality of candidate areas. The selection unit selects one of the candidate areas as a target object area including the target object.

7 Claims, 14 Drawing Sheets

(56) References Cited

U.S. PATENT DOCUMENTS

| | | | |
|---|---|---|---|
| 7,801,392 B2* | 9/2010 | Koyama et al. | 382/305 |
| 8,014,566 B2* | 9/2011 | Ogawa | 382/103 |
| 8,761,496 B2* | 6/2014 | Kokumai et al. | 382/155 |
| 2002/0178135 A1* | 11/2002 | Tanaka | 707/1 |
| 2007/0127773 A1* | 6/2007 | Ogawa | 382/103 |
| 2007/0143108 A1* | 6/2007 | Kurozumi et al. | 704/239 |
| 2008/0144891 A1* | 6/2008 | Hwang et al. | 382/118 |
| 2008/0187234 A1* | 8/2008 | Watanabe et al. | 382/254 |
| 2008/0253660 A1* | 10/2008 | Matsushita et al. | 382/190 |
| 2009/0202145 A1* | 8/2009 | Yokono et al. | 382/160 |
| 2009/0285453 A1* | 11/2009 | Muquit et al. | 382/115 |
| 2010/0020244 A1* | 1/2010 | Mitsuya et al. | 348/699 |
| 2010/0085444 A1* | 4/2010 | Konishi | 348/231.99 |
| 2010/0091125 A1* | 4/2010 | Abe | 348/222.1 |
| 2010/0128927 A1* | 5/2010 | Ikenoue | 382/103 |
| 2011/0170781 A1* | 7/2011 | Bronstein et al. | 382/190 |
| 2011/0199513 A1* | 8/2011 | Ogawa | 348/231.99 |
| 2011/0249899 A1* | 10/2011 | Wu et al. | 382/190 |
| 2011/0249904 A1* | 10/2011 | Mochizuki et al. | 382/225 |
| 2012/0121132 A1* | 5/2012 | Asahara et al. | 382/103 |
| 2012/0134541 A1* | 5/2012 | Hara | 382/103 |
| 2012/0269455 A1* | 10/2012 | Mitsunaga et al. | 382/269 |
| 2012/0301015 A1* | 11/2012 | Tanase et al. | 382/159 |
| 2013/0096941 A1* | 4/2013 | Kanada | 705/2 |
| 2013/0202163 A1* | 8/2013 | Shimada et al. | 382/118 |
| 2014/0016854 A1* | 1/2014 | Nagatomo et al. | 382/149 |

OTHER PUBLICATIONS

Toyama et al, Wallflower: Principles and Practice of Background Maintenance, IEEE, 1999.

* cited by examiner

| DETECTION TARGET | CHANGE THAT CAN BE DETECTED BY DIFFERENCE | NUMBER OF PEOPLE | (a) IDEAL DETECTION RESULT OF TARGET OBJECT | (b) CONVENTIONAL METHOD | (c) CONVENTIONAL METHOD: DIFFERENCE DETECTION | (d) IMAGE THAT IS EXPECTED TO BE DETECTED/COLLECTED BY NEW LEARNING IMAGE COLLECTING APPARATUS | (e) TARGET OBJECT DETECTION AFTER ADDITIONAL LEARNING |
|---|---|---|---|---|---|---|---|
| OTHER THAN TARGET OBJECT AREA | CHANGE |  | × | × | ○ | × | × |
| OTHER THAN TARGET OBJECT AREA | NO CHANGE |  | × | × | × | × | × |
| TARGET OBJECT AREA (IN SAME ENVIRONMENTAL CONDITION AS THAT DURING LEARNING) | CHANGE | INDEPENDENT | ○ | ○ | ○ | ○ | ○ |
| TARGET OBJECT AREA (IN SAME ENVIRONMENTAL CONDITION AS THAT DURING LEARNING) | CHANGE | GROUP | ○ | ○ | ○ | × | ○ |
| TARGET OBJECT AREA (IN SAME ENVIRONMENTAL CONDITION AS THAT DURING LEARNING) | NO CHANGE | INDEPENDENT | ○ | ○ | × | × | ○ |
| TARGET OBJECT AREA (IN SAME ENVIRONMENTAL CONDITION AS THAT DURING LEARNING) | NO CHANGE | GROUP | ○ | ○ | × | × | ○ |
| TARGET OBJECT AREA (IN DIFFERENT ENVIRONMENTAL CONDITION FROM THAT DURING ENVIRONMENT) | CHANGE | INDEPENDENT | ○ | × | ○ | ○ | ○ |
| TARGET OBJECT AREA (IN DIFFERENT ENVIRONMENTAL CONDITION FROM THAT DURING ENVIRONMENT) | CHANGE | GROUP | ○ | × | ○ | × | ○ |
| TARGET OBJECT AREA (IN DIFFERENT ENVIRONMENTAL CONDITION FROM THAT DURING ENVIRONMENT) | NO CHANGE | INDEPENDENT | ○ | × | × | × | ○ |
| TARGET OBJECT AREA (IN DIFFERENT ENVIRONMENTAL CONDITION FROM THAT DURING ENVIRONMENT) | NO CHANGE | GROUP | ○ | × | × | × | ○ |

FIG. 4

LEARNING IMAGE COLLECTION APPARATUS, LEARNING APPARATUS, AND TARGET OBJECT DETECTION APPARATUS

CROSS-REFERENCE TO RELATED APPLICATIONS

This application is based upon and claims the benefit of priority from the prior Japanese Patent Application No. 2012-233694, filed on Oct. 23, 2013, the entire contents of which are incorporated herein by reference.

FIELD

Embodiments of the invention relate to a learning image collection apparatus, a learning apparatus, and a target object detection apparatus.

BACKGROUND

A technique relating to a recognition apparatus that is capable of more effectively collecting learning patterns by classifying a target object in a captured image and tracking the object is disclosed. In the technique, in order to efficiently collect learning patterns, an image including the target object incorrectly classified is collected.

In the case where it is difficult to classify the target object in advance, however, it may be impossible to track the target object. Therefore, it is difficult to collect a new learning image. On the other hand, even if learning of a detector is performed using large amounts of learning data, the detection rate is reduced in the case of an image captured in an environment that differs from that during learning of the detector.

Japanese Patent Application Laid-open No. 2007-310480 relates to the above-mentioned technique, and the entire contents of which are incorporated herein by reference.

BRIEF DESCRIPTION OF THE DRAWINGS

FIG. 4 is an explanatory diagram showing an example of an image necessary for learning that takes into account environmental conditions;

DETAILED DESCRIPTION

Figure 1:
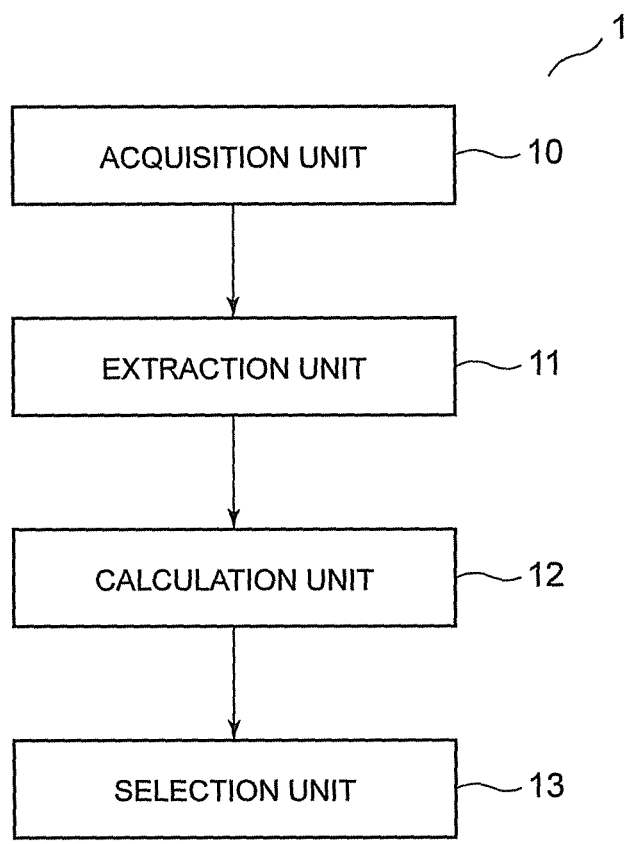
FIG. 1 is a configuration diagram showing an example of a learning image collection apparatus according to a first embodiment.

In view of the above circumstances, an aspect of embodiments provides a learning image collection apparatus including an acquisition unit, an extraction unit, a calculation unit, and a selection unit. The acquisition unit is configured to acquire an image including a target object. The extraction unit is configured to extract, from the image, a plurality of candidate areas being candidates for the target object. The calculation unit is configured to calculate one of a first degree of similarity, a second degree of similarity, and a third degree of similarity, the first degree of similarity being a degree of similarity between one of the candidate areas and a predetermined area, the second degree of similarity being a degree of similarity between a size of the target object and a predetermined size, the third degree of similarity being a degree of similarity between the plurality of candidate areas. The selection unit is configured to select one of the candidate areas as a target object area including the target object in a case where one of the first degree of similarity, the second degree of similarity, and the third degree of similarity is greater than a predetermined threshold value.

A learning apparatus according to an embodiment includes an acquisition unit, an extraction unit, a calculation unit, a selection unit, and a learning unit.

The acquisition unit is configured to acquire an image including a target object. The extraction unit is configured to extract, from the image, a plurality of candidate areas being candidates for the target object. The calculation unit is configured to calculate one of a first degree of similarity, a second degree of similarity, and a third degree of similarity, the first degree of similarity being a degree of similarity between one of the candidate areas and a predetermined area, the second degree of similarity being a degree of similarity between a size of the target object and a predetermined size, the third degree of similarity being a degree of similarity between the plurality of candidate areas. The selection unit is configured to select one of the candidate areas as a target object area including the target object in a case where one of the first degree of similarity, the second degree of similarity, and the third degree of similarity is greater than a predetermined threshold value. The learning unit is configured to cause a classifier to learn with the target object area being training data, the classifier classifying the target object.

A target object detection apparatus according to an embodiment includes an imaging unit, an extraction unit, a calculation unit, a selection unit, a learning unit, and a detection unit. The imaging unit is configured to capture an image including a target object. The extraction unit is configured to extract, from the image, a plurality of candidate areas being candidates for the target object. The calculation unit is configured to calculate one of a first degree of similarity, a second degree of similarity, and a third degree of similarity, the first degree of similarity being a degree of similarity between one of the candidate areas and a predetermined area, the second degree of similarity being a degree of similarity between a size of the target object and a predetermined size, the third degree of similarity being a degree of similarity between the plurality of candidate areas. The selection unit is configured to select one of the candidate areas as a target object area including the target object in a case where one of the first degree of similarity, the second degree of similarity, and the third degree of similarity is greater than a predetermined threshold value. The learning unit is configured to cause a classifier to learn with the target object area being training data, the classifier classifying the target object. The detection unit is configured to detect the target object from the image.

According to the aspects of embodiments, it is possible to provide a learning image collection apparatus that easily collects an image captured in an environment that differs from that during learning of a detector, a learning apparatus using the collected image, and a target object detection apparatus.

Hereinafter, embodiments will be described in detail with reference to the accompanying drawings.

(First Embodiment)

FIG. 1 is a configuration diagram showing an example of a learning image collection apparatus 1 according to a first embodiment. As shown in FIG. 1, the learning image collection apparatus 1 includes an acquisition unit 10, an extraction unit 11, a calculation unit 12, and a selection unit 13. The learning image collection apparatus may be realized by, for example, causing a processor such as a CPU (Central Processing Unit) to execute a program, i.e., software, by hardware such as an IC (Integrated Circuit), or by a combination of software and hardware. An image stored in storage may be used as an image acquired by the acquisition unit 10.

The storage may be realized by storage that is capable of magnetically, optically, or electrically, storing data, such as an HDD (Hard Disk Drive), an SSD (Solid State Drive), a ROM (Read Only Memory), and a memory card.

Figure 2:
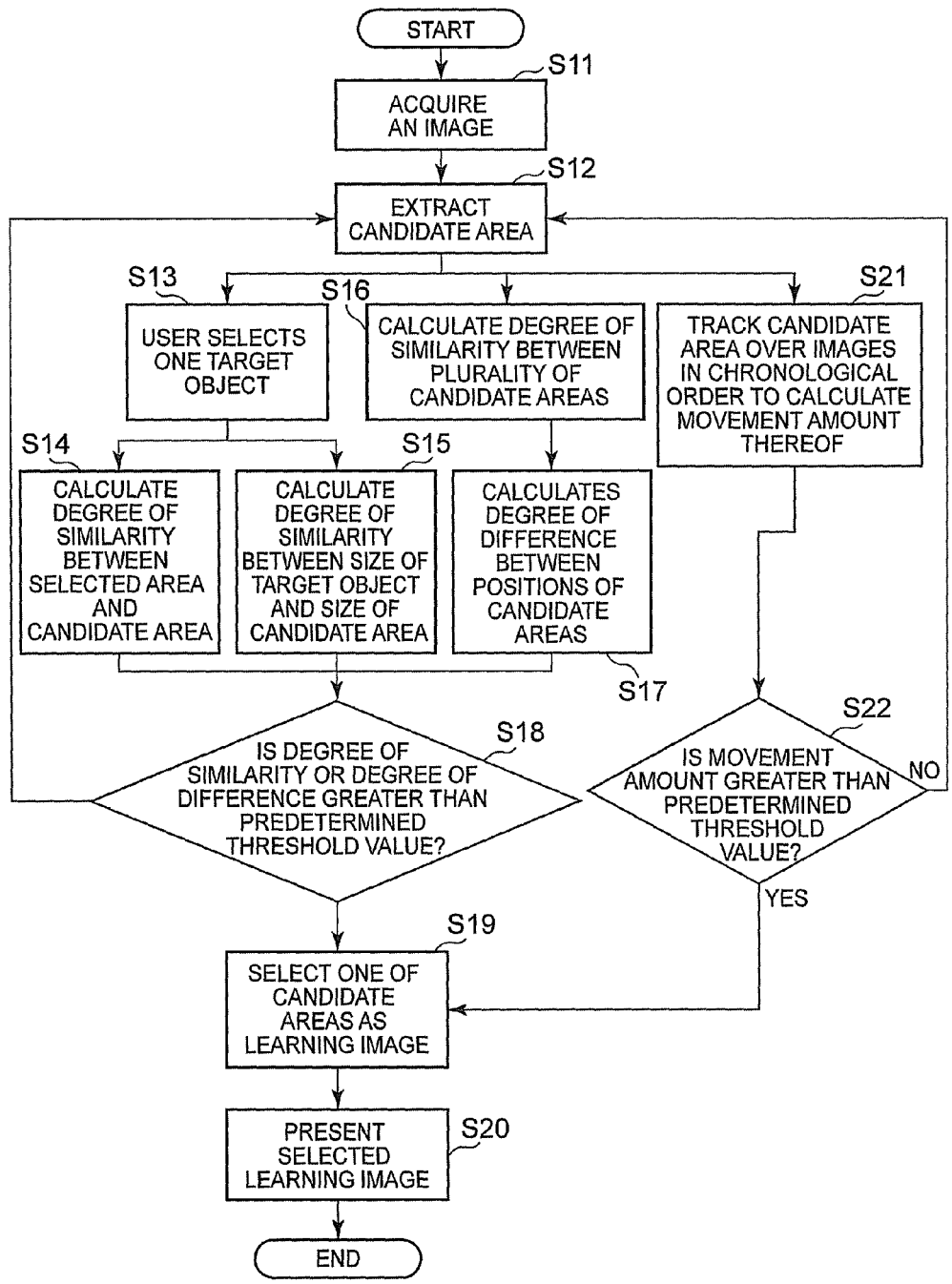
FIG. 2 is a flowchart showing an example of the learning image collection apparatus according to the first embodiment.

FIG. 2 is a flowchart showing an exemplary flow of processing performed by the learning image collection apparatus 1 according to the first embodiment.

First, the learning image collection apparatus 1 acquires an image captured by an imaging apparatus or an image stored in storage (Step S11). Next, an extraction unit extracts an area that can be a candidate for a target object as a candidate area (Step S12). The extraction of the candidate area may be performed by interframe difference processing or background difference processing. For example, the technique described in Wallflower: Principles and Practice of Background Maintenance (Kentaro Toyama, John Krumm, Barry Brumitt, Brian Meyers, Proceedings of the 7th IEEE International Conference on Computer Vision, ICCV 1999, pp 255-261, September, 1999) may be used.

The above-mentioned document relates to the technique described above, and the entire contents of which are incorporated herein by reference.

The candidate area includes, for example, a changing background such as a person, a vehicle, a shaking tree, and an opening/closing door.

Figure 3:
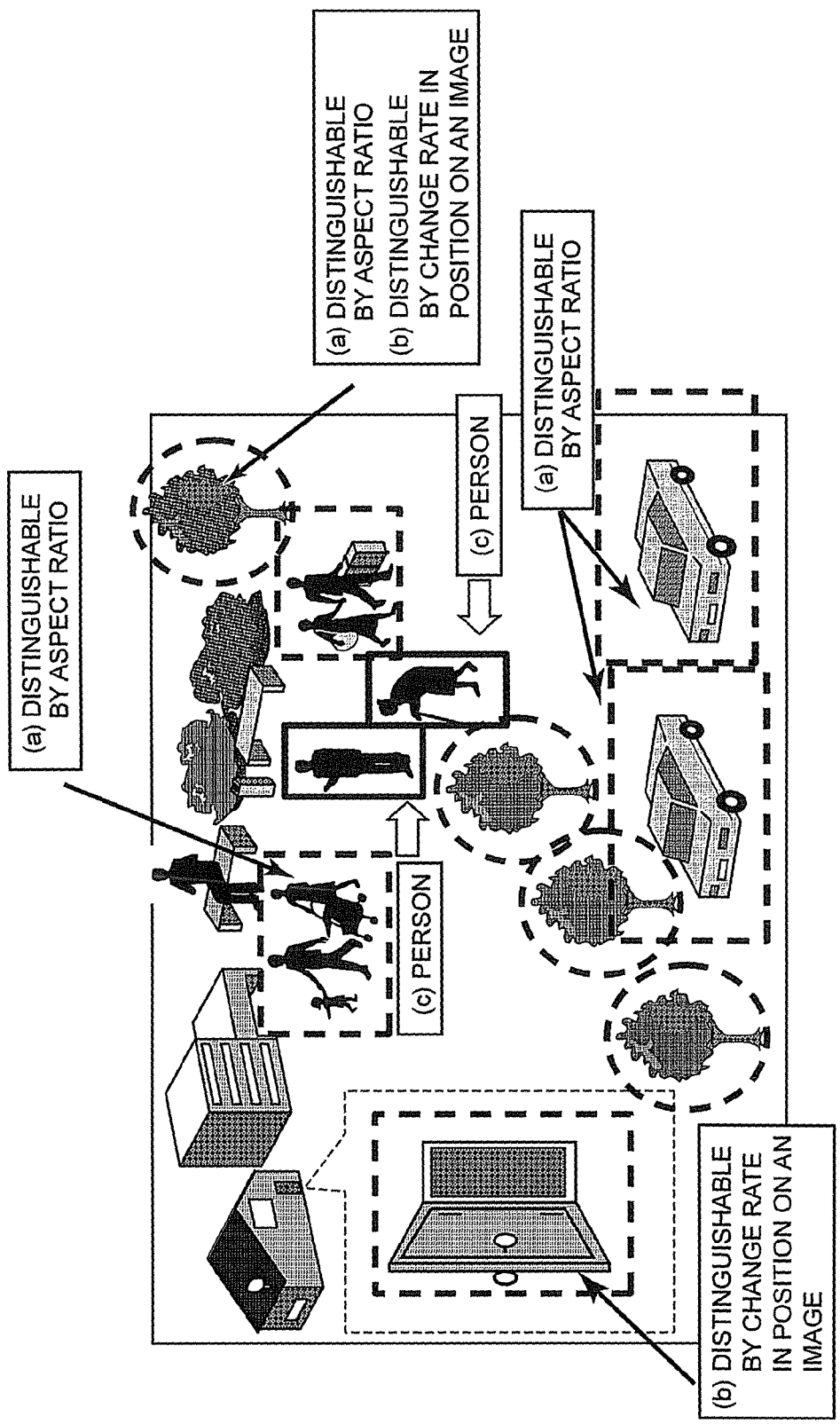
FIG. 3 is an explanatory diagram showing an example of the case where a detection target is a person.

FIG. 3 is a diagram showing an example of the case where a detection target is a person. As shown in FIG. 3, even by performing interframe difference processing or background difference processing, it may be impossible to select only a target that is expected to be collected as learning data.

FIG. 4 is a diagram showing an example of an image necessary for learning that takes into account environmental conditions. In the target object detection processing, it is ideal that the detection can be performed even if the environmental conditions are different from those during learning (X1). However, in fact, the target object is often detected in an environment with a different sunshine condition (light or direction thereof) or the like. In conventional method, it has been difficult to perform the detection if the environmental conditions (ambient conditions) are different from those during learning (X2). By difference detection such as interframe difference processing and background difference processing, it is possible to collect a learning image for target object detection processing from images with different environmental conditions. However, an object that changes over time (e.g., swinging of a tree, opening/closing of a door) is detected even if the object is not a target object (X3). Therefore, only an image suitable for learning is not necessarily collected.

In the case of detecting a person, it is desirable to obtain a learning image with an independent person and different environmental conditions. This is because a plurality of persons can be detected if the independent person can be detected in the case where the detection target is a "person." Specifically, in the proposed method, an independent person can be selected from the obtained image with different environmental conditions (X4). Therefore, by additionally learning the selected person as training data, it is possible to provide an apparatus that is capable of detecting a target object even in different environmental conditions (X5).

In order to efficiently collect images including a target object with different environmental conditions, in images with different environmental conditions as shown in FIG. 3, an individual condition such as (a) comparing aspect ratios of rectangles and (b) a change in position on an image is used. Details of the condition will be described with reference to each step in FIG. 2.

Referring back to FIG. 2, in the case where the extraction unit has extracted a plurality of candidate areas, a user selects an image necessary for learning (Step S13). In the case where a person is desired to be detected, the user selects only an area including the person. In the case where a vehicle is desired to be detected, for example, the user may select only an area including the vehicle. Also in the case where an object other than the person and the vehicle is desired to be detected, the same processing may be performed with the object being a target.

The calculation unit 12 compares the candidate area with the selected or designated target object area to calculate a degree of similarity S1 (Step S14). Here, for the calculation of degree of similarity, for example, normalized correlation processing between the candidate area and the designated target object area is used.

Moreover, the calculation unit 12 calculates a degree of similarity S2 between size information of the candidate area and size information designated in advance (Step S15). Here, as the size information, for example, the size of a target object in vertical and horizontal directions and the aspect ratio of the target object are used.

The degree of similarity S2 (similarity of size information) may be calculated based on, for example, an area by the following formula 1:

$$1/\{|(\text{width\_A}*\text{height\_A})-(\text{width\_B}*\text{height\_B})|/(\text{width\_B}*\text{height\_B})\}$$

where width_A represents the length of a candidate area A in a horizontal direction, height_A represents the length of the candidate area A in a vertical direction, width_B represents the length of the target object area designated in advance in a horizontal direction, and height_B represents the length of the target object area in a vertical direction. Moreover, it is also possible to calculate the degree of similarity S2 based on an aspect ratio by the following formula 2:

$$1/\{|(\text{width\_A}/\text{height\_A})-(\text{width\_B}/\text{height\_B})|/(\text{width\_B}/\text{height\_B})\}.$$

Moreover, the product of the formula 1 and the formula 2 may be used.

If the calculated value of the S2 is small in the candidate area, the size of the candidate area is significantly different from the size information designated in advance. For example, it is estimated that the candidate area having a large value of the S2 is highly likely to include a person. In the case where a person is designated as a detection target, the candidate area having a small value of the degree of similarity S2 corresponds to a vehicle area or the like. When images are collected, a method in which the candidate area having a small value of the degree of similarity S2 is excluded is used. This is favorable because the accuracy of the detection apparatus is improved.

For example, in the case where a person is designated as a detection target, an area where a plurality of persons are overlapped one on the other to be extracted as a single group is not favorable as learning data. If an aspect ratio is used, the value of the degree of similarity S2 of a single group of a plurality of persons overlapped one on the other is small because the aspect ratio of the single group is significantly different from that of a person. The area where a plurality of persons are overlapped one on the other can be excluded from learning data. This is favorable because the accuracy of the detection apparatus is improved.

Moreover, the calculation unit 12 compares the plurality of obtained candidate areas to calculate a degree of similarity S3 (Step S16). Here, for the calculation of degree of similarity, for example, general normalized correlation processing may be used. For example, in the case where there are a candidate area X and N candidate areas $X\_i$ (i=1 to N) other than the candidate area X, the degree of similarity S3 may be calculated by the following formula 3:

$$S3 = 1/N * \Sigma i = 1 \text{ to } N(\text{Sim}(X, X\_i))$$

where Sim (A, B) is a normalized correlation value of A and B. If the candidate area has a small value of the degree of similarity S3, the candidate area has a significantly different pattern from another candidate area compared therewith. For example, a background or the like of the candidate area is highly likely to be unexpectedly extracted. In this case, it is favorable to exclude the candidate area from learning data because the accuracy of the detection apparatus is improved.

Furthermore, the calculation unit 12 calculates a degree of difference S4 between positions of the plurality of candidate areas (Step S17). Here, the degree of difference of positions can be represented by the following formula 4 in the case where there are a candidate area X and M candidate areas $X\_i$ (i=1 to M) having sufficiently high degree of similarity to the candidate area X.

$$S4 = 1/M * \Sigma i = 1 \text{ to } M(\text{Dist}(X, X\_i)) \quad \text{(Formula 4)}$$

where Dist (A, B) represents the Euclidean distance between A and B

In the case where the candidate area has a small value of the degree of difference S4, it is estimated that the candidate area has a pattern appearing only in a specific close place. Examples of such a case include a case where a background area such as opening and closing of an automatic door, which is different from a person desired to be detected, is repeatedly extracted. For example, it is estimated that the candidate area having a large value of the S4 is highly likely to include a person. Moreover, when learning images are collected, a method in which the candidate area having a small value of the degree of difference S4 is excluded is used. This is favorable because the accuracy of the detection apparatus is improved.

The selection unit 13 determines whether or not the degrees of similarity or degree of difference (S1 to S4) calculated by the calculation unit 12 are greater than a predetermined threshold value (Step S18), and selects one of the candidate areas as a learning image. The selection of the candidate area is performed based on the result of any one of the degrees of similarity and degree of difference (S1 to S4), or based on the result of two or more of the degrees of similarity and degree of difference (Step S19).

For example, weights w1 to w4 may be set for the calculated values of the S1 to S4 to perform the following weighting evaluation.

$$(w1*S1) + (w2*S2) + (w3*S3) + (w4*S4) \quad \text{(Formula 5)}$$

The selection unit 13 selects, as a learning image, an area having the evaluation value that is greater than a predetermined threshold value. An area having the evaluation value that is smaller than the predetermined threshold value is excluded from learning data. This is favorable because the accuracy of the detection apparatus for the detection target is improved.

Moreover, the calculation unit 12 calculates a movement amount S5 of the candidate area (Step S21). For example, it only has to track a candidate for a target object over a plurality of images in chronological order to calculate the movement amount thereof. For the tracking processing, for example, the following method may be used.

Dorin Comaniciu, Visvanathan Ramesh, Peter Meer: Real-Time Tracking of Non-Rigid Objects using Mean Shift, pp. 142-149, Proceedings of the 2000 IEEE Computer Society Conference on Computer Vision and Pattern Recognition (CVPR 2000)

The above document relates to the technique described above, and the entire contents of which are incorporated herein by reference.

Whether or not the calculated movement amount S5 is greater than a predetermined threshold value is determined (Step S22), and one of the candidate areas is selected as a learning image. The selection of the candidate area is performed based on the result of any one of the degrees of similarity, degree of difference, and movement amount (S1 to S5), or based on the result of two or more of the degrees of similarity, degree of difference, and movement amount (Step S19).

For example, similarly to the above-mentioned formula 5, weights w1 to w5 may be set for the calculated values of the S1 to S5 to perform the following weighting evaluation.

$$(w1*S1) + (w2*S2) + (w3*S3) + (w4*S4) + (w5*S5) \quad \text{(Formula 5)}$$

The selection unit 13 selects an area having the evaluation value that is greater than a predetermined threshold value as a learning image. An area having the evaluation value that is smaller than the predetermined threshold value is excluded from learning data. This is favorable because the accuracy of the detection apparatus for the detection target is improved.

The selected candidate area may be presented on a display apparatus or the like so that a user can select the candidate area (Step S20).

As described above, by the learning image collection apparatus 1 according to the first embodiment, it is possible to easily collect an image captured in an environment that differs from that during learning of a detector. In particular, in the case where a target object is detected from an image captured in an environment that differs from that during learning of a detector, it may be impossible to perform tracking or additional learning in some cases. However, by using the learning image collecting apparatus according to this embodiment, it is possible to obtain a detection target image that is suitable for learning of a detector.

MODIFIED EXAMPLE

A learning image collecting apparatus according to a modified example of the first embodiment may include a manual selection unit instead of the selection unit 13 in the first embodiment. First, also in this modified example, the same processing of Steps S1 to S18, S21, and S22 as that in the first embodiment is performed.

In Step S19, the manual selection unit sorts out image areas based on the calculation result of any one or two or more of the degrees of similarity S1 to S3, the degree of difference S4, and the movement amount S5. Here, it is favorable to perform weighting evaluation as in Step S19 in the first embodiment, and sort out the image areas in order from the highest evaluation value.

Figure 5:
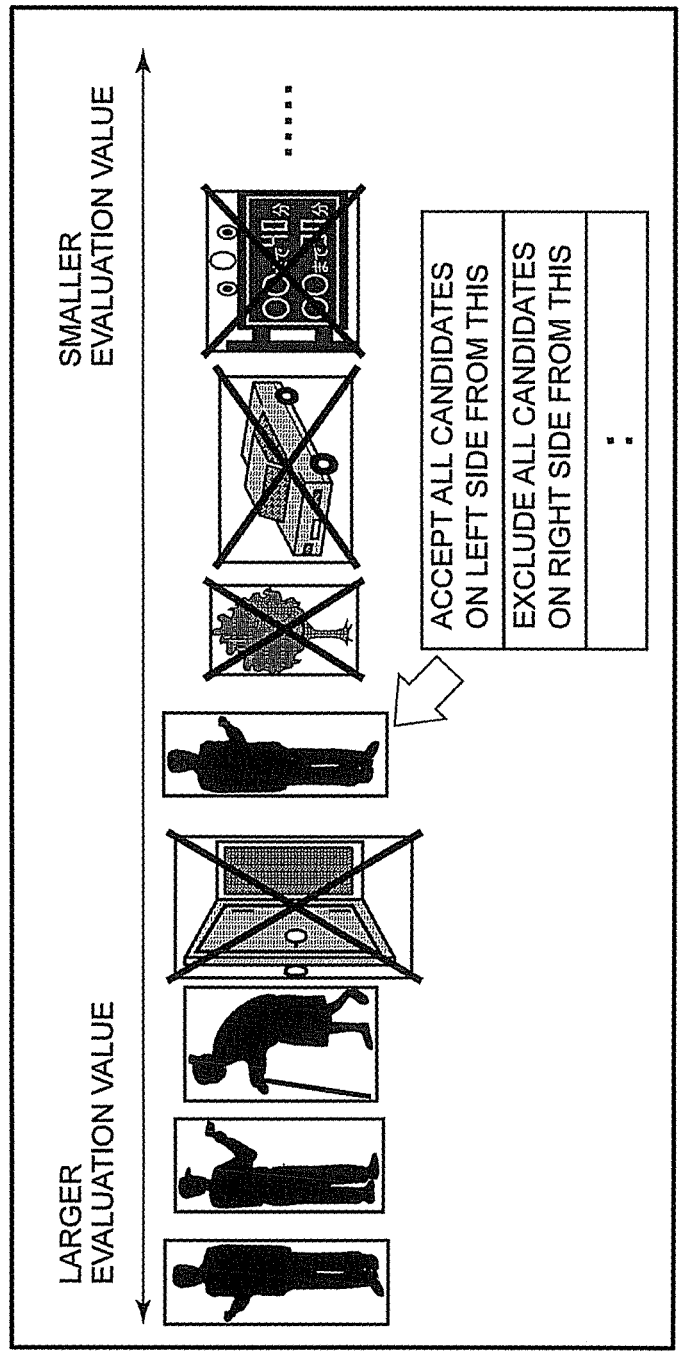
FIG. 5 is a diagram showing an example of a screen according to a modified example of the first embodiment.

FIG. 5 is a diagram showing an example of a case where the image areas are sorted out in order from the highest evaluation value. The manual selection unit causes a display unit to display the sorted image. A user determines which image is selected as a learning image, and the detection target image collecting apparatus receives designation of the image from the user.

Candidate areas for a learning image to be presented to the user are sorted out in order of estimated appropriateness for a learning image. Therefore, the user can preferentially confirm the image area having a high evaluation value. In FIG. 5, the areas are sorted out so that the evaluation value is higher toward the left side of FIG. 5. Therefore, the user only has to confirm the candidate area from the left side. Since it only has to preferentially confirm the candidate area for a learning image that is located on the left side, the selection of a learning image is easily performed. Such confirmation by the user can prevent an inappropriate image area from being selected. Moreover, because the user can exclude an image area having a low evaluation value by simple confirmation, it is also possible to reduce the trouble of confirmation.

Figure 6:
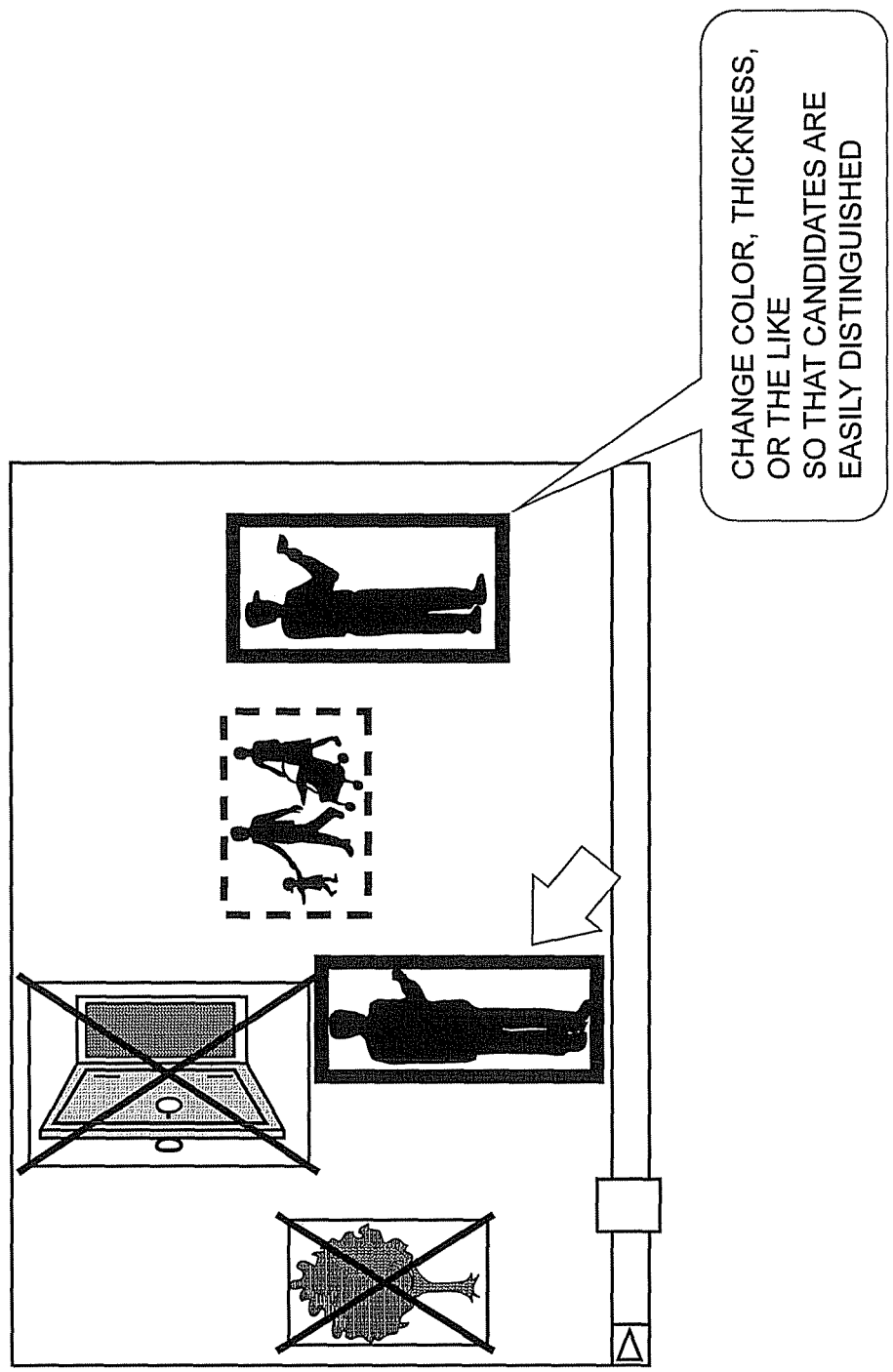
FIG. 6 is a diagram showing an example of the screen according to the modified example of the first embodiment.

Moreover, a surrounding area of an image to be selected may be displayed together with the image. By displaying the surrounding area of the image to be selected together with the image, it is possible to confirm a surrounding area of an area that is desired to be confirmed and make a decision. For example, FIG. 6 is a diagram showing an example in which image areas to be confirmed are overlaid in the entire image and displayed. In the case where a person is a target, a frame surrounding an image including the person may be displayed, and the frame may be displayed with the color or thickness of the frame, the kind of the line, or the like reflecting the evaluation value. For example, the frame is painted red to indicate that those having a darker color have a higher evaluation value, or those painted red have a higher evaluation value and those painted blue have a lower evaluation value. Moreover, the thicker the thickness of the frame is, the higher the evaluation value may be. Alternatively, the kind of the frame border may be changed to a dashed line to indicate that those with the dashed line have a small evaluation value. For example, for those with the highest evaluation value, a symbol such as an arrow may be displayed. In the case where the image of the surrounding area is also displayed and the selection of an image is performed, the user can easily understand what kind of image and which portion of the image are selected.

Figure 7:
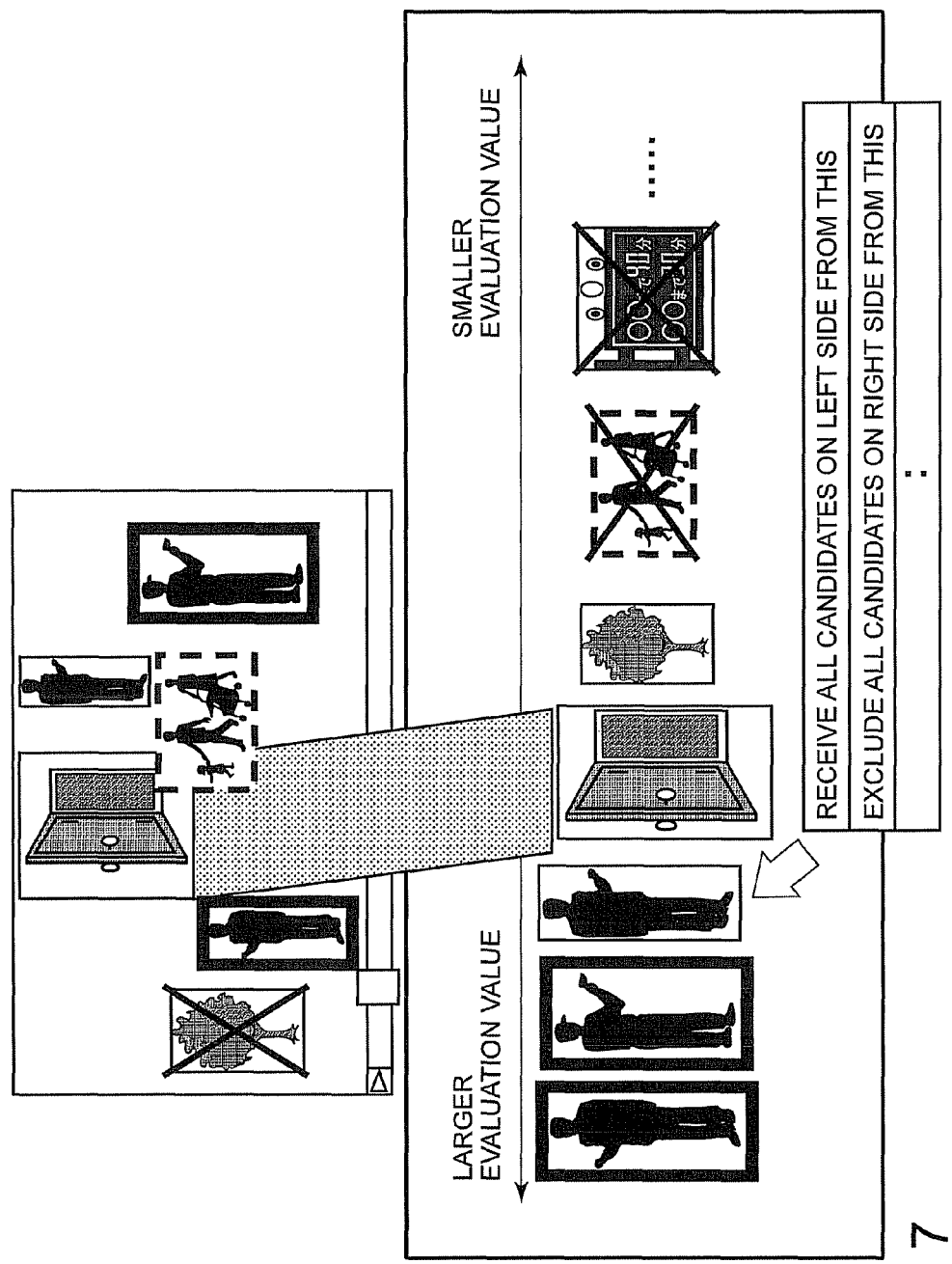
FIG. 7 is a diagram showing an example of the screen according to the modified example of the first embodiment.

On the other hand, because it is hard to understand the magnitude of the evaluation value, a switching mode such as sorting in order of the evaluation value may be separately presented. Moreover, FIG. 7 is a diagram showing an example of a case where FIG. 5 and FIG. 6 are combined. If the candidate areas are sorted out in order from the highest evaluation value, a list of the candidate areas can be more easily checked, so that the user can visually confirm the candidate areas. In addition, by displaying an actual state of the image together therewith, the entire state can be easily understood, which is favorable. "Only candidates in an upper screen may be sorted out to be shown in a lower screen," or a switching mode for "sorting out the candidate areas in order of the evaluation value in the entire video in the lower screen, and displaying, if the candidate in the lower screen is designated, the corresponding entire image in the upper screen", with the lower screen as a main screen, may be presented.

(Second Embodiment)

Figure 8:
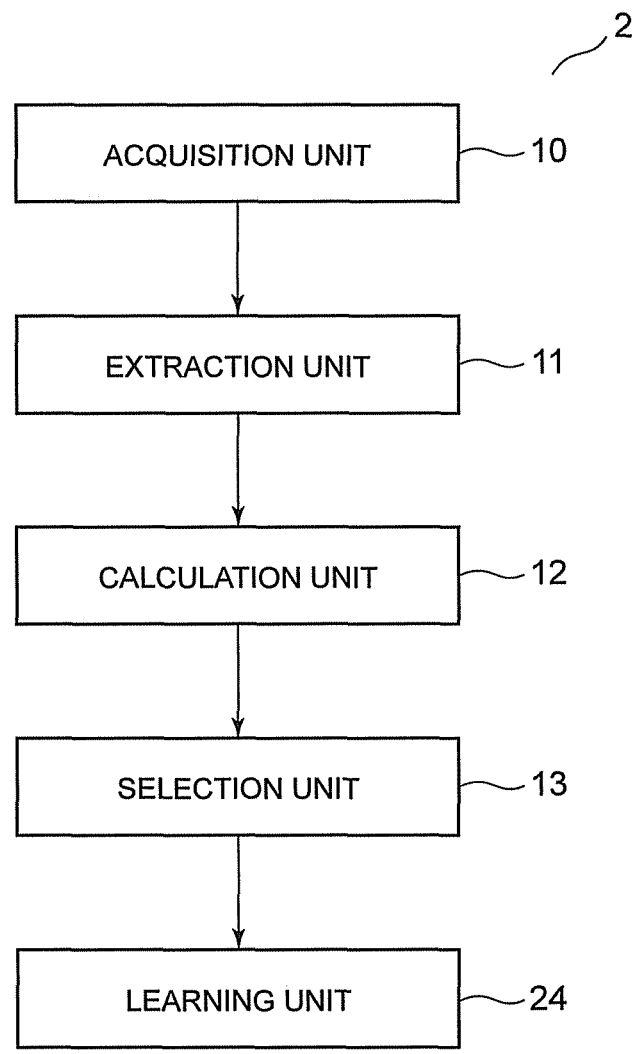
FIG. 8 is a configuration diagram showing an example of a learning apparatus according to a second embodiment.

FIG. 8 is a block diagram showing a learning apparatus 2 according to a second embodiment of the invention. The learning apparatus according to this embodiment includes the acquisition unit 10, the extraction unit 11, the calculation unit 12, the selection unit 13, and a learning unit 24. This embodiment differs from the first embodiment in that the learning unit 24 is provided.

Figure 9:
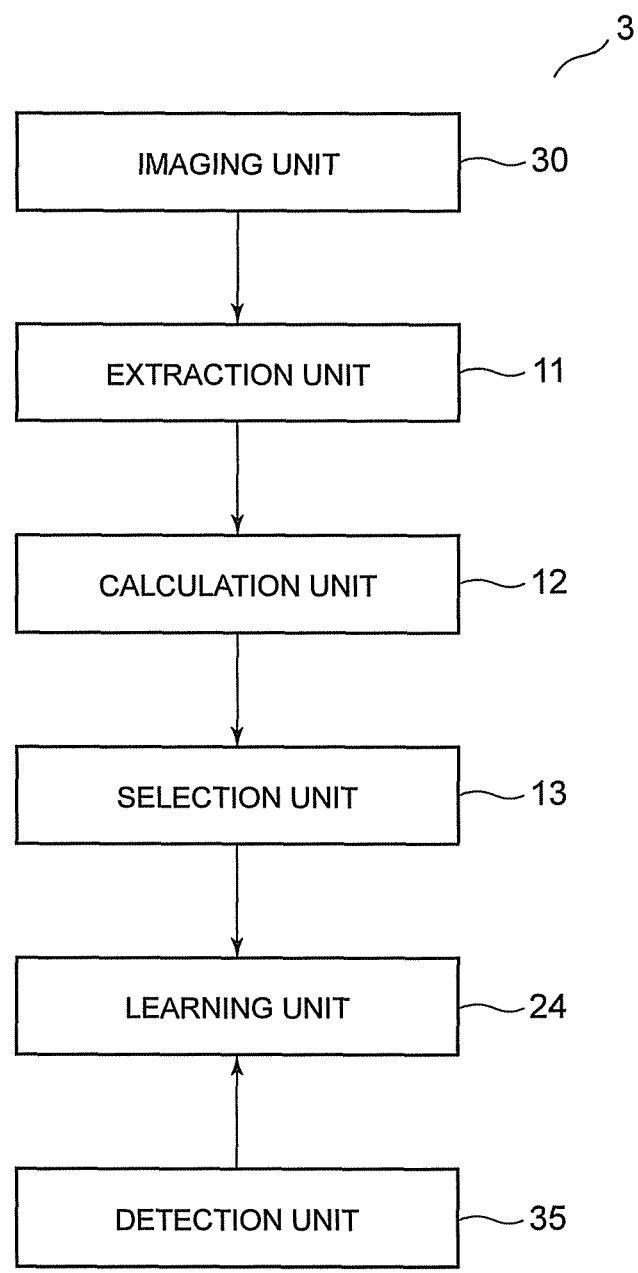
FIG. 9 is a configuration diagram showing an example of a target object detection apparatus according to the second embodiment.

FIG. 9 shows a target object detection apparatus 3 using the learning apparatus according to the second embodiment of the invention. This embodiment differs from the first embodiment in that an imaging unit 30, the learning unit 24, and a detection unit 35 are provided. Moreover, FIG. 9 differs from FIG. 8 in that the imaging unit 30 is provided.

Hereinafter, the same configurations and processing as those according to the first embodiment will be denoted by the same numerals, and a description thereof will be omitted.

Figure 10:
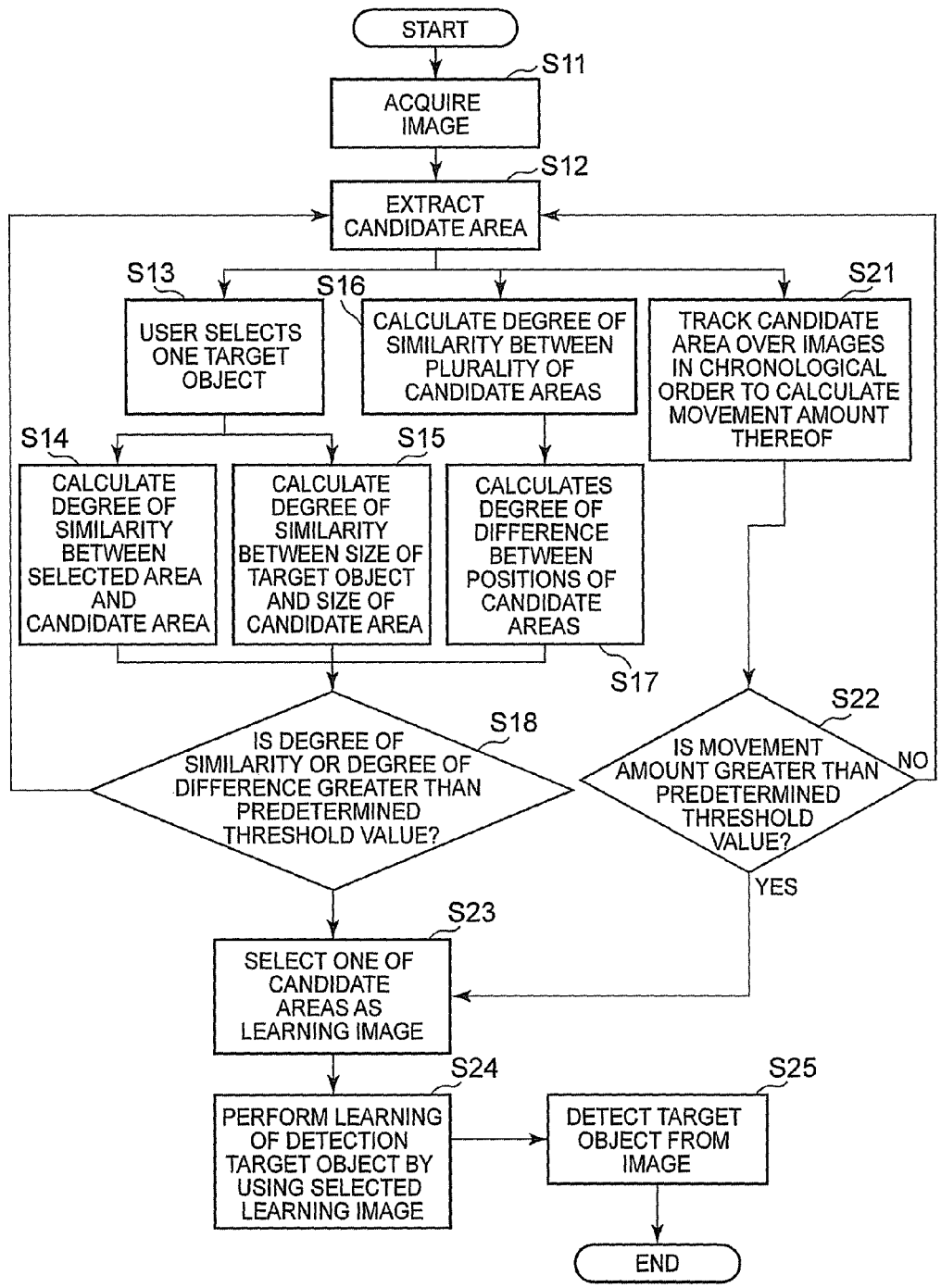
FIG. 10 is a flowchart showing an example of the learning apparatus according to the second embodiment.

Next, with reference to FIG. 10, an operation of the target object detection apparatus according to the second embodiment of the invention will be described. It should be noted that FIG. 10 is a flowchart showing the operation of the target object detection apparatus according to the second embodiment of the invention.

First, the imaging unit 30 captures an image. The captured image is acquired by the acquisition unit 10 in the case of the learning apparatus shown in FIG. 8. Next, also in the second embodiment, the same processing of Steps S12 to S18, S21, and S22 as that in the first embodiment is performed.

A detection target image suitable for learning of a detector is selected in Step S23, and the learning unit 24 calculates information necessary for the detection by using the image and performs learning (Step S24). For the calculation, it only has to perform additional learning such as G. Cauwenberghs and T. Poggio, "Incremental and Decremental Support Vector Machine Learning," in Adv. Neural Information Processing Systems pp. 409-415 (NIPS*2000), Incremental and Decremental Support Vector Machine Learning.

The above-mentioned document relates to the technique described above, and the entire contents of which are incorporated herein by reference.

The result calculated by learning is key information for the detection, which is generally called dictionary in the field of image recognition. Based on the calculated result, the detection unit 35 detects a designated object from an image (Step S25).

It should be noted that in Step S24, learning of a new detector, which operates together with the existing detector, as an additional detection unit may be performed. Then, in Step S25, the common result between the result obtained from the existing detector and the result obtained from the newly added detector is detected. Alternatively, both the result obtained from the existing detector and the result obtained from the newly added detector may be used as a detection result. For example, in the case where the detection parameter or the like used by the existing detector differs from that used by the newly added detector, by using the result obtained by comparing both of the detection results, it is possible to improve the detection performance.

As described above, by the learning apparatus 2 according to the second embodiment, it is possible to easily collect an image captured in an environment that differs from that during learning of a detector. Moreover, by the target object detection apparatus 3 according to the second embodiment, it is possible to improve detection performance for a target object by collecting images in different environments. In particular, in the case where a target object is detected from an image captured in an environment that differs from that during learning of a detector, it may be impossible to perform tracking or additional learning in some cases. However, by using the learning apparatus according to this embodiment, it is possible to obtain a detection target image that is suitable for learning of a detector. Therefore, it is possible to improve detection performance for a target object.

(Third Embodiment)

Figure 11:
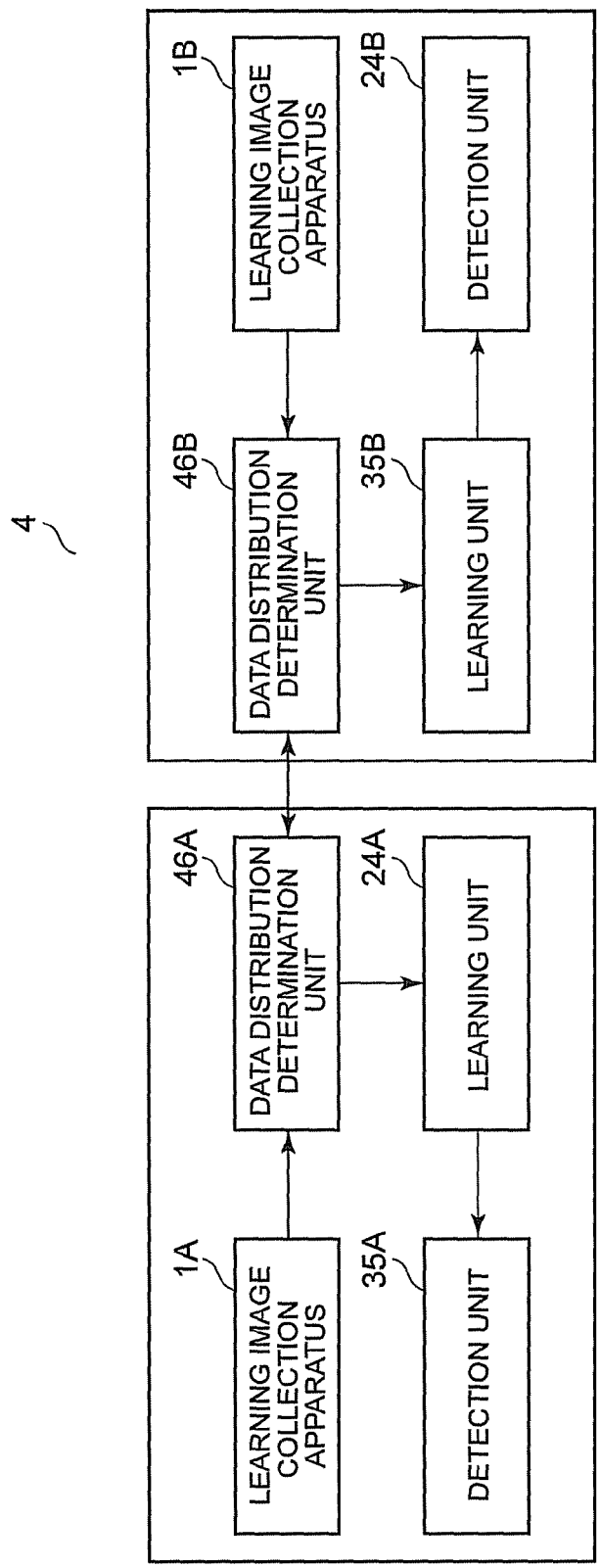
FIG. 11 is a configuration diagram showing an example of a target object detection apparatus according to a third embodiment.

FIG. 11 is a configuration diagram showing an example of a target object detection apparatus 4 according to a third embodiment of the invention. This embodiment differs from the second embodiment in that a data distribution determination unit 46 (46A and 46B) is provided. Hereinafter, the same configurations and processing as those according to the first embodiment or second embodiment will be denoted by the same numerals, and a description thereof will be omitted.

Figure 12:
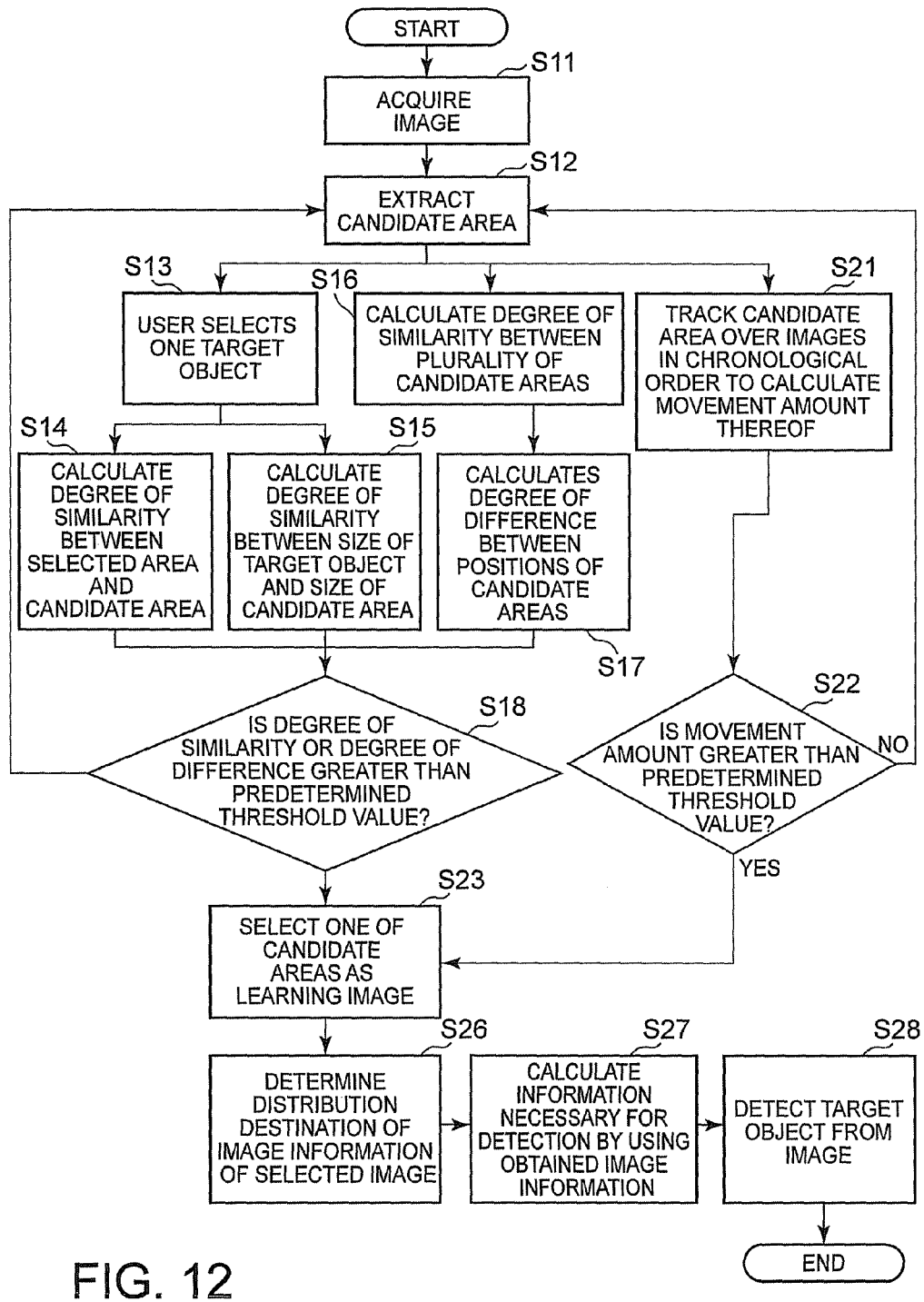
FIG. 12 is a flowchart showing an example of the target object detection apparatus according to the third embodiment.

Next, with reference to FIG. 11 and FIG. 12, an operation of the target object detection apparatus according to the third embodiment of the invention will be described. It should be noted that FIG. 12 is a flowchart showing the operation of the target object detection apparatus according to the third embodiment of the invention.

Hereinafter, a case where a learning image collection apparatus 1A collects images, and image information is distributed to a target object detection apparatus including a learning image collection apparatus 1B will be described. First, also in this embodiment, the same processing of Steps S11 to S18, S21, and S22 as that in the first embodiment is performed.

A detection target image suitable for learning of a detector is selected in Step S23, and the data distribution determination unit 46 determines a distribution destination of image information of the selected image (Step S26). At this time, as the distribution destination, for example, a target object detection apparatus that is placed in a geographically close position may be selected. Alternatively, image information distributed to a candidate for the distribution destination in the past is compared with the information of the detection target image obtained in Step S23, and a target object detection apparatus having image information whose degree of similarity is within a range designated in advance may be designated as the distribution destination.

The learning unit 24 calculates information necessary for the detection by using the obtained image information (Step S27). For the calculation, the same processing as that in Step S25 in the second embodiment may be performed. Based on the calculation result, the detection unit 35 performs detection processing (Step S28).

By the above-mentioned processing, it is possible to obtain not only a detection target image collected by the learning image collection apparatus 1A but also a detection target image collected by the different learning image collection apparatus 1B. The number of target object detection apparatuses may be two or more.

For example, in Step S26, a target object detection apparatus having image information whose degree of similarity is high is designated as a distribution destination. The target object detection apparatus having image information whose degree of similarity is high is one having image information having a similar angle of depression, illuminance, or the like. In this case, an image obtained from a target object detection apparatus that captures an image having a large angle of depression is distributed to another target object detection apparatus that captures an image having a large angle of depression, and an image obtained from a target object detection apparatus that captures an image having low illuminance is distributed to another target object detection apparatus that captures an image having low illuminance. As a result, it is possible to collect more detection target images and perform learning. Moreover, an object can be detected more precisely.

On the contrary, in the case where a target object detection apparatus having image information whose degree of similarity is low is designated as a distribution destination in Step S26, for example, an image obtained from a target object detection apparatus that captures an image having a large angle of depression is distributed to another target object detection apparatus that captures an image having a small angle of depression, and an image obtained from a target object detection apparatus that captures an image having low illuminance is distributed to another target object detection apparatus that captures an image having high illuminance. As a result, it is possible to collect more detection target images and perform learning. Moreover, an object can be detected more stably.

Modified Example 1

Figure 13:
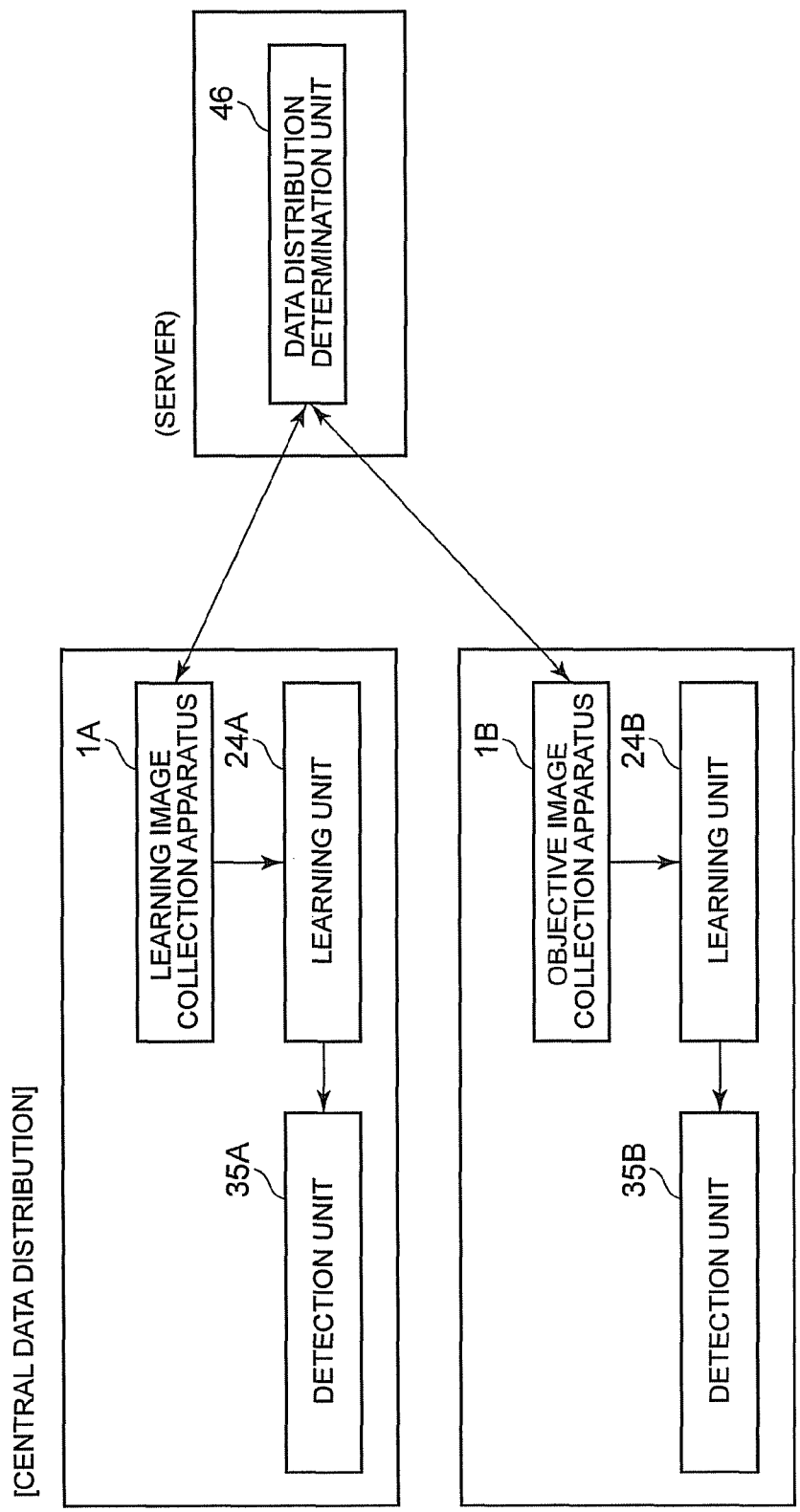
FIG. 13 is a configuration diagram showing a modified example of the third embodiment.

In FIG. 11, the target object detection apparatuses are configured to distribute image information to each other. However, as shown in FIG. 13, the data distribution determination unit 46 may have an independent configuration. In this case, for example, the data distribution determination unit is located in a central server, and image information collected by the learning image collection apparatus 1A or 1B is once transmitted to the data distribution determination unit 46 in the central server. The data distribution determination unit 46 determines the distribution destination of the image information, and the image information is distributed to an individual target object detection apparatus. The number of target object detection apparatuses may be two or more.

Modified Example 2

Figure 14:
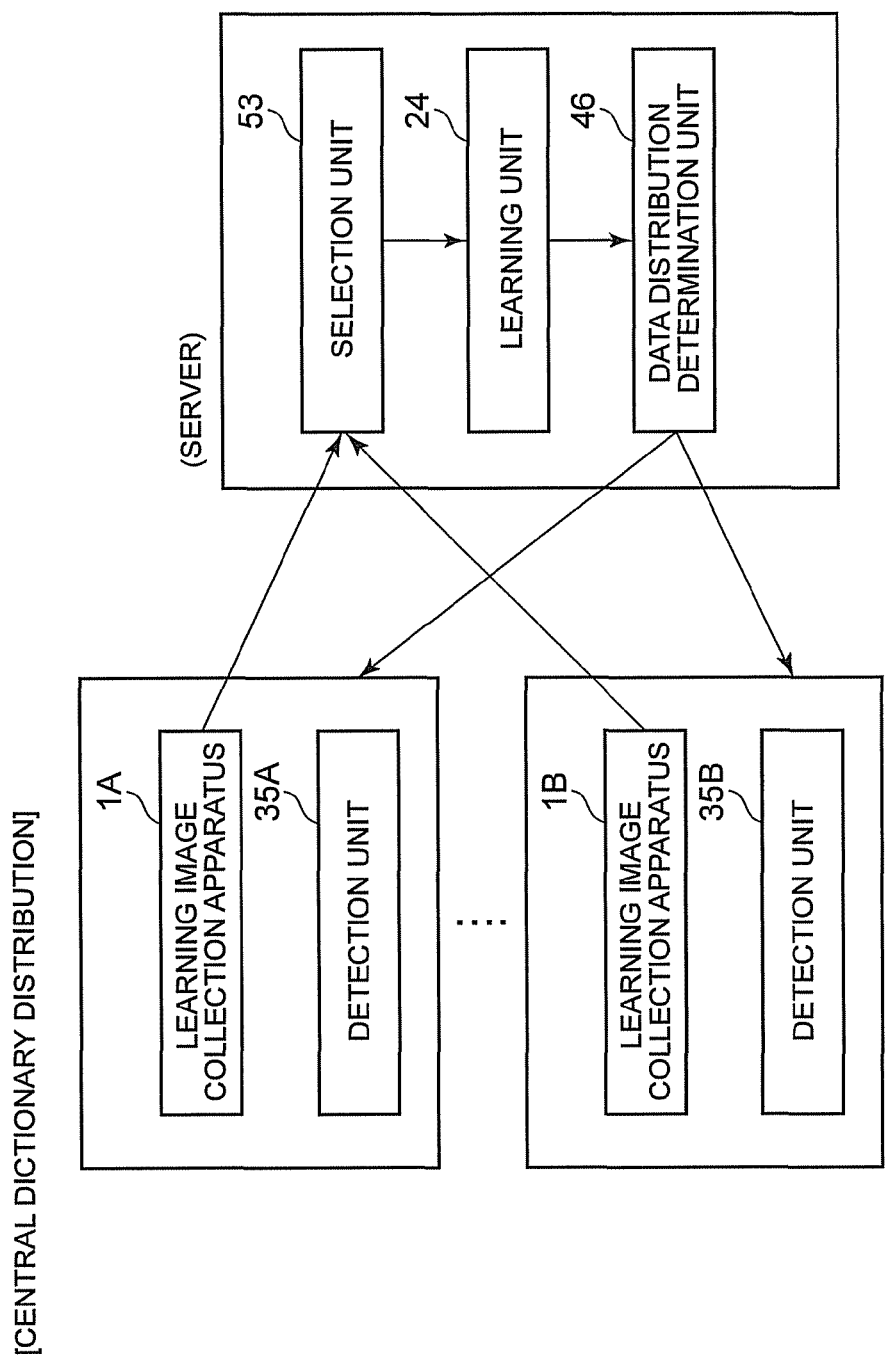
FIG. 14 is a configuration diagram showing a modified example of the third embodiment.

In FIG. 11, the target object detection apparatuses are configured to distribute image information to each other. However, as shown in FIG. 14, the selection unit, the learning unit, and the data distribution determination unit 46 may be located in the central server. In this case, the selection unit 53 compares image information obtained from the learning image collection apparatuses (1A and 1B), and selects an image. For example, an image obtained from a learning image collection apparatus that is placed in a geographically close position is selected. Alternatively, image information obtained from the learning image collection apparatuses is compared, and an image obtained from a learning image collection apparatus having image information whose degree of similarity is within a range designated in advance is selected.

The learning unit 24 calculates information necessary for the detection by using the obtained image information. The data distribution determination unit 46 in the central server distributes the calculation result to a detection unit 35A or 35B, which is determined as a distribution destination. The detection unit 35A or 35B performs detection based on the distributed information.

(Hardware Configuration)

The learning image collection apparatus, learning apparatus, and target object detection apparatus according to the embodiments described above include a controller such as a CPU (Central Processing Unit), storage such as a ROM and a RAM, external storage such as an HDD and an SSD, a display apparatus such as a display, an input apparatus such as a mouse and a keyboard, an imaging apparatus such as a camera, and the like, and can be realized by a hardware configuration using a normal computer.

The program executed by the apparatus according to the embodiments described above is provided by being incorporated into a ROM or the like in advance.

Moreover, the program executed by the apparatus according to the embodiments may be provided by being stored in a computer readable storage medium such as a CR-ROM, a CD-R, a memory card, a DVD, and a flexible disk (FD) as a file in an installable format or executable format.

Moreover, the program executed by the apparatus according to the embodiments may be provided by being stored on a computer connected to a network such as the Internet and downloaded through the network. Alternatively, the program executed by the apparatus according to the embodiments may be provided or distributed through a network such as the Internet.

The program executed by the apparatus according to the embodiments has a module configuration for realizing the respective units described above on a computer. As actual hardware, for example, a controller loads the program from external storage into storage and executes the program, thereby realizing the respective units on the computer.

It should be noted that the invention is not limited to the above-mentioned embodiments and components can be modified and embodied in the implementation stage without departing from the gist of the invention. Moreover, by appropriately combining the plurality of components disclosed in the embodiments described above, various inventions can be formed. For example, some components may be deleted from all components shown in the embodiments. Further, components in different embodiments may be appropriately combined.

For example, each step in the flowchart of the embodiments described above may be performed in a different order, a plurality of steps may be performed concurrently, or each Step may be performed in a different order for each implementation unless contrary to the nature thereof.

As described above, according to the embodiments, it is possible to easily collect images in an environment that is different from that during learning of a detector, and to improve detection performance for a target object by learning.

What is claimed is:

1. A learning image collection apparatus, comprising:
an acquisition unit configured to acquire a plurality of sequential images including a target object;
an extraction unit configured to extract, from each of the sequential images, a plurality of candidate areas being candidates for the target object, and a position of each of the candidate areas;
a calculation unit configured to calculate one of a first degree of similarity, a second degree of similarity, a third degree of similarity, and a fourth degree of similarity, the first degree of similarity being a degree of similarity between each of the candidate areas and a predetermined area, the second degree of similarity being a degree of similarity between a size of each of the candidate areas and a predetermined size, the third degree of similarity being a degree of similarity between the candidate areas, and the fourth degree of similarity being a change of the position of each of the candidate areas in chronological order between the sequential images; and
a selection unit configured to select one of the candidate areas as a target object area including the target object in a case where one of the first degree of similarity, the second degree of similarity, the third degree of similarity, and the fourth degree of similarity is greater than a predetermined threshold value,
wherein
the target object is a person,
the size used for the second degree of similarity is an aspect ratio of each of the candidate areas, and
the selection unit is configured to select one of a plurality of target object areas by using the second degree of similarity and the fourth degree of similarity, and to exclude one of the candidate areas from the target object area in a case where the candidate area has the second degree of similarity greater than a predetermined threshold value and the fourth degree of similarity smaller than a predetermined threshold value.

2. The apparatus according to claim 1, wherein
the calculation unit is configured to further calculate a movement amount of each of the candidate areas between the sequential images by using a degree of similarity between the candidate areas in the sequential images, and
the selection unit is configured to select one of the candidate areas as the target object area in a case where the movement amount is greater than a predetermined threshold value.

3. The apparatus according to claim 2, wherein the selection unit is configured
to select one of the target object areas by using the second degree of similarity and the movement amount to yield a selected target object area, and
to exclude one of the candidate areas from the selected target object area in a case where the candidate area has the second degree of similarity greater than a predetermined threshold value and the movement amount smaller than a predetermined threshold value.

4. A learning apparatus, comprising:
an acquisition unit configured to acquire a plurality of sequential images including a target object;
an extraction unit configured to extract, from each of the sequential images, a plurality of candidate areas being candidates for the target object, and a position of each of the candidate areas;
a calculation unit configured to calculate one of a first degree of similarity, a second degree of similarity, a third degree of similarity, and a fourth degree of similarity, the first degree of similarity being a degree of similarity between one of the candidate areas and a predetermined area, the second degree of similarity being a degree of similarity between a size of each of the candidate areas and a predetermined size, the third degree of similarity being a degree of similarity between the plurality of candidate areas, and the fourth degree of similarity being a change of the position of each of the candidate areas in chronological order between the sequential images;
a selection unit configured to select one of the candidate areas as a target object area including the target object in a case where one of the first degree of similarity, the second degree of similarity, the third degree of similarity, and the fourth degree of similarity is greater than a predetermined threshold value; and a learning unit configured to cause a classifier to learn, with the target object area being training data, the classifier classifying the target object, wherein the target object is a person, the size used for the second degree of similarity is an aspect ratio of each of the candidate areas, and the selection unit is configured to select one of a plurality of target object areas by using the second degree of similarity and the fourth degree of similarity, and to exclude one of the candidate areas from the target object area in a case where the candidate area has the second degree of similarity greater than a predetermined threshold value and the fourth degree of similarity smaller than a predetermined threshold value.

5. The apparatus according to claim 4, wherein the calculation unit is configured to calculate a movement amount of each of the candidate areas between the sequential images by using a degree of similarity between the candidate areas in the sequential images, and the selection unit is configured to select one of the target object areas by using the second degree of similarity and the movement amount, and to exclude one of the candidate areas from the target object area in a case where the candidate area has the second degree of similarity greater than a predetermined threshold value and the movement amount smaller than a predetermined threshold value.

6. A target object detection apparatus, comprising:

an imaging unit configured to capture a plurality of sequential images including a target object;

an extraction unit configured to extract, from each of the sequential images, a plurality of candidate areas being candidates for the target object, and a position of each of the candidate areas;

a calculation unit configured to calculate one of a first degree of similarity, a second degree of similarity, a third degree of similarity, and a fourth degree of similarity, the first degree of similarity being a degree of similarity between each of the candidate areas and a predetermined area, the second degree of similarity being a degree of similarity between a size of each of the candidate areas and a predetermined size, the third degree of similarity being a degree of similarity between the plurality of candidate areas, and the fourth degree of similarity being a change of the position of each of the candidate areas in chronological order between the sequential images;

a selection unit configured to select one of the candidate areas as a target object area including the target object in a case where one of the first degree of similarity, the second degree of similarity, the third degree of similarity, and the fourth degree of similarity is greater than a predetermined threshold value;

a learning unit configured to cause a classifier to learn, with the target object area being training data, the classifier classifying the target object; and a detection unit configured to detect the target object from the sequential image, wherein the target object is a person, the size used for the second degree of similarity is an aspect ratio of each of the candidate areas, and the selection unit is configured to select one of a plurality of target object areas by using the second degree of similarity and the fourth degree of similarity, and to exclude one of the candidate areas from the target object area in a case where the candidate area has the second degree of similarity greater than a predetermined threshold value and the fourth degree of similarity smaller than a predetermined threshold value.

7. The apparatus according to claim 6, wherein the calculation unit is configured to calculate a movement amount of each of the candidate areas between the sequential images by using a degree of similarity between the candidate areas in the sequential images, the selection unit is configured to select one of the target object areas by using the second degree of similarity and the movement amount, and to exclude one of the candidate areas from the target object area in a case where the candidate area has the second degree of similarity greater than a predetermined threshold value and the movement amount smaller than a predetermined threshold value.

* * * * *